United States Patent Office 3,457,142
Patented July 22, 1969

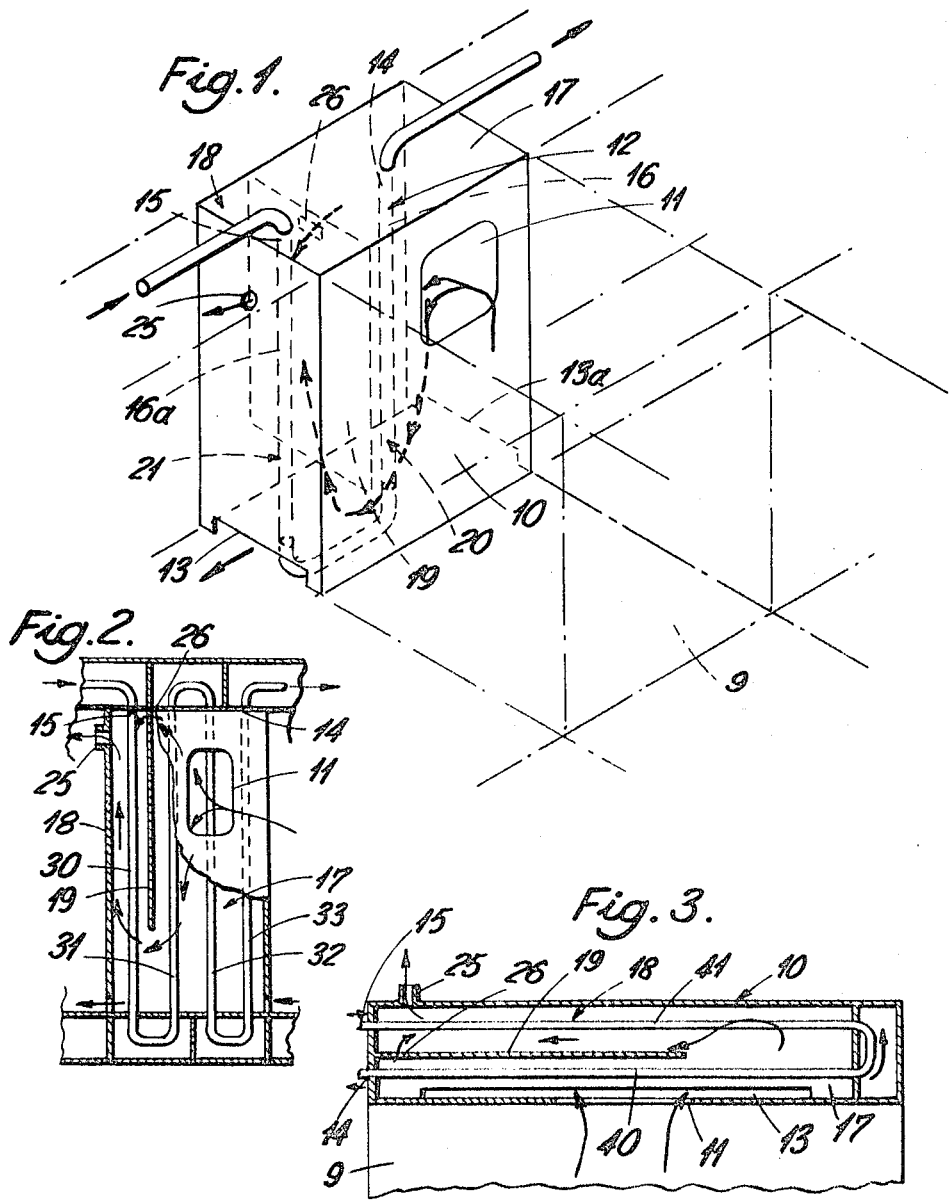

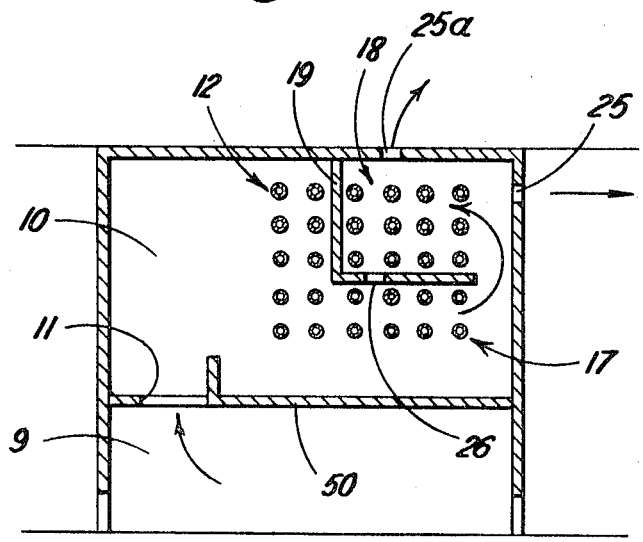

3,457,142
MULTI-STAGE FLASH EVAPORATORS HAVING BAFFLE MEANS AND A VENT IN THE CONDENSER
Roy Starmer, Peterlee, Durham, England, assignor to Applied Research and Engineering Limited, Durham, England, a British company
Filed Dec. 15, 1966, Ser. No. 601,959
Claims priority, application Great Britain, Dec. 20, 1965, 53,939/65
Int. Cl. C02b *1/06;* B01d *3/06*
U.S. Cl. 202—173                               1 Claim

ABSTRACT OF THE DISCLOSURE

A multi-stage flash evaporator comprises, for at least one stage, a condensation chamber having a vapour inlet, a vent for any non-condensable gases and a baffle for defining the vapour path therebetween, the baffle being preferably arranged between the vapour inlet and the vent whereby the vapour path is extended.

---

This invention relates to multi-stage flash evaporators employed in a distillation plant for the production of distilled or potable water from seat water or brackish water.

It has been found that the presence of non-condensable gases reduces the efficiency of these evaporators. It is normal to take precautions to seal the evaporator stages from atmosphere and to degas the feed to the evaporator to minimise the inclusion of non-condensable gases. Nevertheless, further gases are evolved by the liquid being fed through the evaporator during the evaporation process. It is thus necessary to provide means for extracting these gases from each of the stages of the evaporator.

According to the invention a multi-stage flash evaporator comprises, for at least one stage, a flash chamber, a condensation chamber, an aperture or passageway allowing vapour flashed off in the flash chamber to pass into the condensation chamber, which condensation chamber contains a vapour inlet, one or more condensing surfaces for the vapour entering the chamber, an outlet or vent for the non-condensable gases present and a baffle or baffles for defining a continuous path for the vapour as it passes through the condensation chamber from the vapour inlet towards the vent for the non-condensable gases, the vent being at or adjacent to the end of the vapour path.

Each condensing surface, if there is more than one, is preferable parallel to its adjacent surface or surfaces and the or each baffle is preferably parallel to the or each condensing surface.

It is preferred that the or each condensing surface is the surface of a tube through which fluid is passed, which fluid has a temperature below that of the vapour being condensed on the surface of the tube, the tube passing through the condensation chamber in a straight line path or in a zig-zag path, i.e. the tube is bent on itself one or more times. It will be appreciated that as the fluid passes through the or each tube it will be heated by the vapour condensing on the surface of the tube and thus the inlet end of the tube will be cooler than the outlet end of the tube. Similarly a condensing surface located further from the vapour inlet of the condensation chamber than another condensing surface will tend to be cooler than that other condensation surface.

It is also preferred that the baffle or baffles define an extended path for the vapour thereby preventing the vapour from passing direct (i.e. in a straight line path) from the vapour inlet to the vent. In this case, the or one of the baffles lies between at least a part of a condensing surface and the vapour inlet, in addition to lying between the vent for the non-condensable gases and the vapour inlet. Preferably the or each condensing surface, or the or each part of the condensing surface or surfaces, which thus lies between the baffle and the vent is colder than the or each condensing surface, or the or each part of the condensation surface or surfaces, which lies between the baffle and the vapour inlet.

As stated above, the baffle or baffles are preferably located between the vapour inlet and the vent in order to extend the path the vapour has to travel to pass through the vent in addition to the vent being located at or adjacent to the end of the vapour path. In a case in which it is only practicable to locate the vent adjacent the end of the vapour path as defined by the baffle or baffles, in order to prevent the formation of a stagnant quantity of non-condensable gas in the part of the condensation chamber which lies beyond the vent in the direction of the vapour path, there is preferably provided an aperture in, or a passageway through, the baffle nearest to the vent to allow vapour to enter the said part of the condensation chamber from another direction from that of the said defined direction of flow of vapour.

The non-condensable gases from each stage of the evaporator may be cascaded, at a lower pressure, to a common removal point provided in the last stage or, alternatively, several removal points may be provided.

By way of example, three embodiments in accordance with the invention will now be described with reference to the accompanying diagrammatic drawings in which:

FIGURE 1 is a view of a first embodiment in which the condensation chamber of one of the stages of a multi-stage flash evaporator has a condensing tube which is bent once on itself to provide two vertical condensing surfaces;

FIGURE 2 is a part sectioned, part cut-away view of the condensation chamber of a similar arrangement to that shown in FIGURE 1 except the condensing tube is bent on itself three times to provide four vertical condensing surfaces;

FIGURE 3 is a section through the condensation chamber of a second embodiment in which the condensation chamber has a condensing tube which is bent once on itself to provide two horizontal condensing surfaces; and FIGURE 4 is a section through the condensation chamber of a third embodiment in which the condensation chamber has a plurality of horizontal condensing tubes passing straight through the chamber.

With reference to FIGURE 1, the condensation chamber 10 of one of the stages of a multi-stage flash evaporator comprises a closed container and is provided with an aperture 11 to act as a vapour inlet for the vapour passing into the condensation chamber from the associated flash chamber 9 (shown in phantom) of the stage of the evaporator, a tube 12 on which the vapour condenses to form a quantity of distillate and an outlet 13 for the distillate. Within the opposed wall of the condensation chamber 10 there is a similar outlet 13*a*, which comprises the outlet from the condensation chamber of the adjacent stage of the evaporator, thereby allowing the distillate to be cascaded through each stage in turn to the last stage of the evaporator. The tube 12 is a single length of tube which is bent on itself (outside the condensation chamber) to form two legs 20, 21 located in vertical-parallel spaced relation one with the other, within the condensation chamber. Fluid, which comprises the evaporator feed and which has a temperature below that of the vapour entering the chamber 10, is pumped through the legs 20, 21 of the tube 12 in the direction of the arrows and thus causes the external surfaces of the said legs of the tube to act as condensing surfaces 16, 16a for the vapour.

It is to be appreciated that the fluid in the tube 12 will be heated by the vapour during its passage through the condensation chamber and thus the outlet end 14 of the tube 12 will be hotter than the inlet end 15.

The chamber 10 is also partially sub-divided into two sections 17, 18 by a vertical baffle 19 which extends parallel to the two legs 20, 21 of the tube 12, the arrangement being such that the section 17 contains the leg 20 and the hotter end 14 of the tube and the other section 18 contains the leg 21 and the cooler end 15 of the tube. As shown in FIGURE 1, the section 17 also contains the vapour inlet 11. The baffle 19, whilst being connected to opposed side walls and the top wall of the chamber 10, is spaced from the bottom wall of the chamber whereby the vapour is prevented from passing in a straight line path to the major part of the leg 21 of the tube and is confined to a path which first passes under the baffle.

The section 18 of the chamber 10 is provided with a vent aperture 25. This vent is provided for removal of the non-condensable gases from the chamber, which gases form part of the vapour flashed off in the associated flash chamber. The location of the vent is chosen at the furthest practical point from the vapour inlet 11 in the section 17 of the chamber and adjacent the cooler end 15 of the tube 12. By this construction, the path of the vapour is such that the non-condensable gases will be carried to the vent 25 whilst the escape of steam through the vent is minimised. With the construction of chamber 10 as shown in FIGURE 1, it is not possible to provide the vent 25 in the top wall of the section 18 of the chamber because of the fluid feed to the tube 12. Thus, to prevent a stagnant quantity of non-condensable gas collecting between the vent 25 and the top wall of section 18, a small aperture 26 is provided in the top of the baffle through which a small quantity of vapour will be allowed to enter the section 18. This aperture also prevents a collection of gas adjacent the top wall of section 17.

In this example, the non-condensable gases that pass through the vent 25 are cascaded through each of the stages of the evaporator in turn to a common removal vent in the last stage.

The construction shown in FIGURE 2 is substantially identical to that shown in FIGURE 1 except that the tube 12 is bent on itself three times to form four vertical legs or condensing surfaces 30 to 33. The baffle 19 is, in this construction, located between the legs 30 and 31 thereby isolating the coolest leg of the tube 12 from the other legs of the tube. As before, the major portion of the vapour is confined to passing under the baffle before it can reach the vent 25.

With reference to FIGURE 3, the condensation chamber 10, is provided above the associated flash chamber 9 but, as in the first embodiment, is divided into two sections 17, 18 by a baffle 19, which sections are provided with the vapour inlet 11 and the vent 25 respectively. The condensing tube is also bent on itself outside the chamber 10 but, in this embodiment, is arranged to provide two horizontally extending legs or condensing surfaces 40, 41. As in the first embodiment, the cooler end 15 of the tube is located in the section 18 of the chamber and an aperture 26 is provided through the baffle 19 to prevent a quantity of non-condensable gas remaining stagnant adjacent the cooler end 15 of the tube 12 or underneath the baffle adjacent the hotter end 14 of the tube.

The condensation chamber 10 of the evaporator shown in FIGURE 4 comprises a bundle of straight-through condensing tubes 12. Vapour from the associated flash chamber 9 passes into the condensation chamber 10 through a vapour inlet 11 and a tray 50 is provided for collection of the distillate. The tubes 12 are arranged in parallel relation with each other and the tubes which are located furthest from the inlet 11 are partially divided off from the remainder by an L-shaped baffle 19, each leg of the baffle being parallel to the tubes 12. The chamber is thus divided into two sections 17, 18, as in the embodiments previously described, and the baffle is arranged so that the vapour cannot pass in a direct straight-line path to a vent 25 in the section 18 of the chamber. The vent, as before, is provided for the removal of the non-condensable gases and, in this embodiment, may be located either in the side wall of the chamber or in an alternative position 25a in the top wall of the chamber. Also, as in the embodiments previously described, an aperture 26 is provided in the baffle 19 to prevent a quantity of non-condensable gas collecting in the closed end of the section 18 or underneath the baffle.

The invention is not limited to the specific details of the four embodiments described above. For example, it is not essential that a baffle is provided in each stage of the evaporator and in some stages more than one baffle may be provided. Also, in some cases it is preferred to remove the non-condensable gases periodically throughout the length of the evaporator rather than cascade all the gas to the last stage.

I claim:
1. In a multi-stage flash evaporator, at least one stage thereof comprising:
 (a) a flash evaporation chamber,
 (b) a condensation chamber having side walls and top and bottom walls,
 (c) one of the side walls of said condensation chamber having adjacent said top wall an inlet for vapour from said evaporation chamber,
 (d) one of said side walls of said condensation chamber having adjacent said top wall an outlet vent for non-condensable gases,
 (e) a vapour baffle in said condensation chamber defining, with the walls of said chamber, a tortuous path between the inlet and outlet vent, said baffle extending from said top wall of said condensation chamber and stopping short of said bottom wall of said chamber, thereby leaving a gap so that vapour can pass from the inlet along one side of said baffle, through the gap and along the other side of said baffle to the outlet vent,
 (f) a conduit for a coolant extending along both sides of said baffle in said condensation chamber, and
 (g) said baffle having a passageway passing therethrough adjacent said top wall of said condensation chamber which permits non-condensable gases to pass from one side of said baffle to the other whereby the collection of a stagnant quantity of non-condensable gas in said condensation chamber adjacent said one wall is prevented.

References Cited
UNITED STATES PATENTS

| | | | |
|---|---|---|---|
| 3,908,618 | 10/1959 | Bethon | 202—174 |
| 3,096,256 | 7/1963 | Worthen et al. | 202—173 |
| 3,180,805 | 4/1965 | Chirico | 202—173 |
| 3,326,280 | 6/1967 | Bosguain et al. | 202—173 |

WILBUR L. BASCOMB, Jr., Primary Examiner

U.S. Cl. X.R.

202—182, 185, 197; 203—4, 11, 40